US006772119B2

(12) United States Patent
Chaudhari et al.

(10) Patent No.: US 6,772,119 B2
(45) Date of Patent: Aug. 3, 2004

(54) COMPUTATIONALLY EFFICIENT METHOD AND APPARATUS FOR SPEAKER RECOGNITION

(75) Inventors: Upendra V. Chaudhari, Briarcliff Manor, NY (US); Ganesh N. Ramaswamy, Ossining, NY (US); Ran Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 10/315,648

(22) Filed: Dec. 10, 2002

(65) Prior Publication Data

US 2004/0111261 A1 Jun. 10, 2004

(51) Int. Cl.[7] .................................................. G10L 3/02
(52) U.S. Cl. ..................................... 704/246; 704/236
(58) Field of Search ................................ 704/226–228, 704/233–236, 203, 204, 269, 246–248

(56) References Cited

U.S. PATENT DOCUMENTS

| | | | | |
|---|---|---|---|---|
| 5,469,529 A | * | 11/1995 | Bimbot et al. | 704/246 |
| 5,666,466 A | * | 9/1997 | Lin et al. | 704/246 |
| 5,924,065 A | * | 7/1999 | Eberman et al. | 704/231 |

OTHER PUBLICATIONS

R.D. Zilca, "Text Independent Speaker Verification using Utterance Level Scoring and Covariance Modeling," IEEE Tran. Speech and Audio Proc., vol. 10, No. 6 (Sep. 2002).

Zilca et al., "The Sphericity Measure for Cellular Speaker Verification," ICASSP (2002).

R.D. Zilca, "Using Second Order Statistics for Text Independent Speaker Verification", Odyssey 2001 Speaker Recognition Workshop, Crete–Greece (Jun. 2001).

R.D. Zilca, "Text Independent Speaker Verification using Covariance Modeling", IEEE Signal Processing Letters, vol. 8, No. 4 (Apr. 2001).

* cited by examiner

*Primary Examiner*—David D. Knepper
(74) *Attorney, Agent, or Firm*—Ryan, Mason & Lewis, LLP; Thu Ann Dang, Esq.

(57) ABSTRACT

A speaker recognition technique is provided that can operate within the memory and processing constraints of existing portable computing devices. A smaller memory footprint and computational efficiency are achieved using single Gaussian models for each enrolled speaker. During enrollment, features are extracted from one or more enrollment utterances from each enrolled speaker, to generate a target speaker model based on a sample covariance matrix. During a recognition phase, features are extracted from one or more test utterances to generate a test utterance model that is also based on the sample covariance matrix. A sphericity ratio is computed that compares the test utterance model to the target speaker model, as well as a background model. The sphericity ratio indicates how similar test utterance speech is to the speech used when the user was enrolled, as represented by the target speaker model, and how dissimilar the test utterance speech is from the background model.

23 Claims, 1 Drawing Sheet

COMPUTATIONALLY EFFICIENT METHOD AND APPARATUS FOR SPEAKER RECOGNITION

FIELD OF THE INVENTION

The present invention relates generally to speaker recognition techniques, and more particularly, to methods and apparatus for determining the identity of a speaker given a speech sample.

BACKGROUND OF THE INVENTION

A number of techniques have been proposed or suggested for identifying one or more speakers in an audio stream. For example, U.S. patent application Ser. No. 09/345,237, filed Jun. 30, 1999, discloses a method and apparatus that automatically transcribe audio information from an audio source while concurrently identifying speakers in real-time, using an existing enrolled speaker database. While currently available speaker recognition algorithms perform well for many applications, they typically impose computational requirements that exceed the available resources of portable computing devices, such as personal digital assistants (PDAs).

Generally, currently available speaker recognition algorithms employ background and target speaker models that are loaded into memory. Thus, the memory footprint required to store such background and target speaker models typically exceeds the amount of available memory in most portable computing devices. In addition, currently available speaker recognition algorithms have processor requirements that exceed the computational capacity of most portable computing devices.

Furthermore, portable computing devices, such as personal digital assistants, together with the personal and confidential information stored thereon, can be easily lost or stolen due to their small dimensions. Thus, many portable computing devices incorporate one or more access control features to prevent unauthorized users from accessing the data and applications stored thereon. For example, a biometric access control technique can be used to recognize one or more authorized users. Currently, most portable computing devices incorporate a limited number of input devices. For example, while many portable computing devices incorporate a microphone to enable a user to enter information using speech recognition techniques, they generally do not include a camera or a fingerprint imager.

Thus, a need exists for a speaker recognition technique that can operate within the memory and processing constraints of existing portable computing devices. A further need exists for a speaker recognition technique that may be deployed as an access control mechanism on existing portable computing devices.

SUMMARY OF THE INVENTION

Generally, the present invention provides a speaker recognition technique that can operate within the memory and processing constraints of existing portable computing devices. The disclosed speaker recognition technique achieves a smaller memory footprint and computational efficiency using single Gaussian models for each enrolled speaker. During an enrollment phase, features are extracted from one or more enrollment utterances from each enrolled speaker, to generate a target speaker model based on a sample covariance matrix. Thereafter, during a recognition phase, features are extracted from one or more test utterances to generate a test utterance model that is also based on the sample covariance matrix. Finally, the speaker recognition technique of the present invention computes a normalized similarity score, referred to as a sphericity ratio, that compares the test utterance model to the target speaker model, as well as a background model.

The present invention identifies a speaker given a sample of his or her speech, by computing a similarity score based on the sphericity ratio. The sphericity ratio compares the given speech to the target speaker model and to the background models created during the enrollment phase. Thus, the sphericity ratio incorporates the target, test utterance, and background models. Generally, the sphericity ratio indicates how similar the test utterance speech is to the speech used when the user was enrolled, as represented by the target speaker model, and how dissimilar the test utterance speech is from the background model, thus allowing the speaker to be recognized.

The sphericity ratio score may be expressed as follows:

$$\text{Score} = -\text{trace}(CU\ \text{inv}(CS))/\text{trace}(CU\ \text{inv}(CB)),$$

where CS is the sample covariance matrix of the features extracted from the target speaker training data, CB is the sample covariance matrix of the features extracted from the background data, and CU is the sample covariance matrix of the features extracted from the speech utterance that needs to be recognized. Trace( ) indicates the trace operator of matrices, and inv( ) indicates the inverse operator of matrices. The present invention is invariant to scaling of the features extracted from speech, showing more robust recognition. In addition, the present invention is text independent and can recognize a speaker regardless of the words spoken by the speaker. The recognition score generated by the present invention can be used to recognize the identity of the speaker by (i) comparing the score of a given speaker model to scores obtained against other speaker models; or (ii) applying a threshold to the score to verify whether the speaker is the person that the speaker has asserted himself or herself to be.

A more complete understanding of the present invention, as well as further features and advantages of the present invention, will be obtained by reference to the following detailed description and drawings.

DETAILED DESCRIPTION OF PREFERRED EMBODIMENTS

Figure 1:
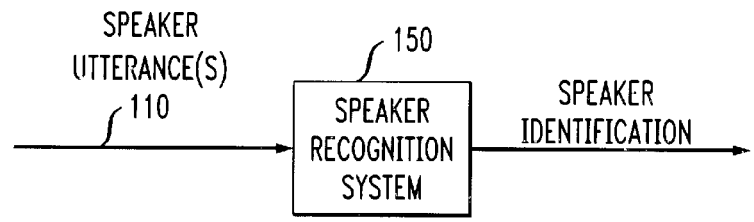
FIG. 1 illustrates a speaker recognition system in accordance with the present invention.

FIG. 1 illustrates a speaker recognition system 150 in accordance with the present invention. As shown in FIG. 1, one or more utterances 110 from a speaker are applied to the speaker recognition system 150 and the speaker recognition system 150 identifies the speaker from one or more enrolled speakers. The speaker identification optionally includes a confidence score. The speaker recognition system 150 may be incorporated, for example, in a portable computing device, such as a personal digital assistant, to provide a biometric access control feature. The recognition score generated by the present invention can be used to recognize the identity of the speaker by comparing the score of a given speaker model to scores obtained against other speaker models (also known as speaker identification) or by applying a threshold to the score to determine whether the speaker is the person that the speaker has asserted himself or herself to be (also known as speaker verification).

According to one aspect of the invention, single Gaussian models are used for each enrolled speaker. A single Gaussian model does not require iterative training. In addition, a geometrically-meaningful distortion measure between the models is used to generate a speaker similarity score. In this manner, the speaker recognition system 150 can operate within the available memory and processing constraints of existing portable computing devices.

During an enrollment or learning phase, discussed further below in conjunction with FIG. 2, features are computed from the speech signal for every speech frame, and a model is created by computing a sample covariance matrix of features. The sample covariance feature matrix is obtained by going through the speech frames only once without iterating, using the well known maximum likelihood estimation formula for the covariance of the speech features. Generally, in an enrollment phase, a target speaker model is being trained from speech data provided by the speaker. A background model is also computed using the same methodology on a large amount of speech data spoken by many different speakers. The background model may be installed in the speaker recognition system 150, for example, at the factory. The background model provides a basis for determining how dissimilar an utterance from a speaker is from utterances of other speakers.

Similarly, during a speaker recognition phase, discussed further below in conjunction with FIG. 3, features are computed from the speech signal for every speech frame, and a model is created by computing the sample covariance matrix of features. Generally, the speaker recognition phase makes a decision on the identity of the speaker given a sample of his or her speech, by matching the given speech to the target speaker model and to the background models created during the enrollment phase. More particularly, speaker recognition is performed using a symmetric distortion measure between the two models, referred to herein as a "sphericity ratio." The sphericity ratio, discussed further below, is a formula that operates on the two covariance matrices.

The memory footprint of the sample covariance models is extremely small. In addition, the processing requirements of the speaker recognition system 150 are orders of magnitude less than current speaker recognition systems. Thus, the disclosed speaker recognition system 150 is particularly well suited for use in portable computing devices having limited memory and processing capacity, such as personal digital assistants. The accuracy of the speaker recognition system 150 is comparable to the accuracy of existing methods requiring a larger memory footprint and computational resources. The accuracy of the speaker recognition system 150 is particularly good when the acoustic environment of the enrollment phase matches the acoustic environment of the recognition phase (i.e., in acoustic environments where enrollment and recognition are expected to be performed using the same type of acoustic transducer), such as when the enrollment utterances and test utterances are obtained using the same or similar microphone in a personal digital assistant. The present invention exhibits the property of being invariant to scaling of the features extracted from speech, showing more robust recognition. In addition, the present invention is text independent and can recognize a speaker regardless of the words spoken by the speaker.

Enrollment

Figure 2:
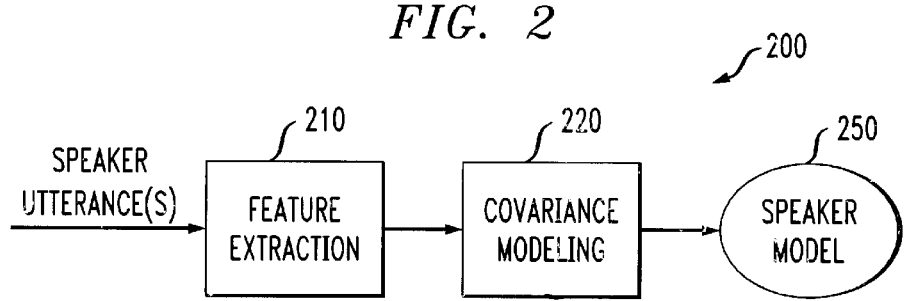
FIG. 2 is a schematic block diagram illustrating an enrollment or learning phase incorporating features of the present invention.

FIG. 2 is a schematic block diagram illustrating an enrollment or learning phase 200 incorporating features of the present invention. Generally, the enrollment phase computes features from the speech signal for every speech frame, and creates a model by computing the sample covariance matrix of features.

A user must speak during enrollment. The speaker utterances are gathered and processed by a feature extraction stage 210 that segments the digitized speech data into overlapping frames. Thereafter, a vector of features is extracted from every speech frame. The speaker recognition method of the present invention can work in conjunction with any signal processing method that produces features from speech frames, as would be apparent to a person of ordinary skill in the art. The enrollment phase generates the target speaker model 250. The target speaker model 250 is computed by a covariance modeling stage 220 as the sample covariance matrix of the speech feature vectors.

Background models are factory-trained in the same manner. The memory footprint of the background models is therefore also extremely small.

Speaker Recognition

Figure 3:
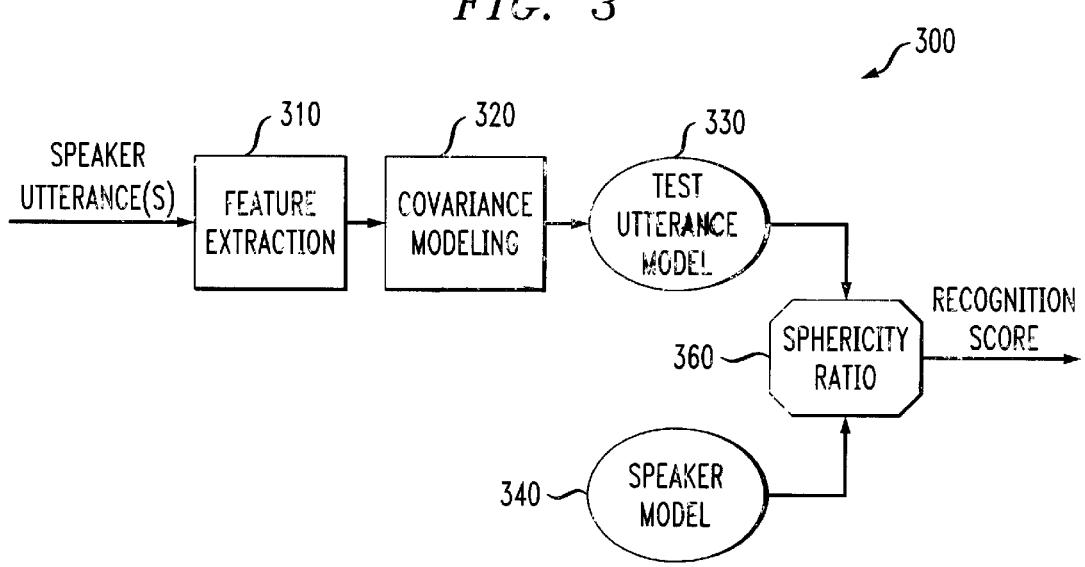
FIG. 3 is a schematic block diagram illustrating a speaker recognition phase incorporating features of the present invention.

FIG. 3 is a schematic block diagram illustrating a speaker recognition phase 300 incorporating features of the present invention. The speaker recognition phase 300 employs a feature extraction stage 310 to compute features from the speech signal for every speech frame. The test utterance model 330 is computed by a covariance modeling stage 320 as the sample covariance matrix of the speech feature vectors, in the same way that target model 250 and background model are trained during the enrollment phase 200. The speaker recognition phase 300 identifies the speaker given a sample of his or her speech, by computing a similarity score based on the sphericity ratio at stage 360. The sphericity ratio compares the given speech to the target speaker model and to the background models created during the enrollment phase. As discussed hereinafter, the sphericity ratio incorporates the target, test utterance, and background models. The sphericity ratio indicates how similar the test utterance speech 330 is to the speech used when the user was enrolled, as represented by the target speaker model 340, thus allowing the speaker to be recognized.

The sphericity ratio score may be expressed as follows:

$$\text{Score} = -\text{trace}(CU \text{ inv}(CS))/\text{trace}(CU \text{ inv}(CB)),$$

where CS is the sample covariance matrix of the features extracted from the target speaker training data, CB is the sample covariance matrix of the features extracted from the background data, and CU is the sample covariance matrix of the features extracted from the speech utterance that needs to be recognized. Trace( ) indicates the trace operator of matrices, and inv( ) indicates the inverse operator of matrices.

Thus, the numerator of the sphericity ratio evaluates how dissimilar the test utterance is from the target speaker training data. Likewise, the denominator of the sphericity ratio evaluates how dissimilar the test utterance is from the background model.

The score can be used to recognize the identity of the user either by comparing the score of a given speaker model to scores obtained against other speaker models (also known as identification) or thresholding the score to make an acceptance/rejection decision (also known as verification).

It is to be understood that the embodiments and variations shown and described herein are merely illustrative of the principles of this invention and that various modifications may be implemented by those skilled in the art without departing from the scope and spirit of the invention.

What is claimed is:

1. A method for recognizing a speaker, comprising the steps of:
   extracting features from one or more enrollment utterances to generate a target speaker model based on a sample covariance matrix generated from said extracted enrollment features;
   extracting features from one or more test utterances to generate a test utterance model based on a sample covariance matrix generated from said extracted test features; and
   computing a sphericity ratio to recognize said speaker, said sphericity ratio comparing said test utterance model to said target speaker model and to a background model.

2. The method of claim 1, wherein said one or more enrollment utterances are obtained in an acoustic environment that is substantially matched to an acoustic environment of said one or more test utterances.

3. The method of claim 2, wherein said acoustic environment is associated with a portable computing device.

4. The method of claim 1, wherein said sphericity ratio is used to recognize the identity of said speaker by comparing said sphericity ratio of a given speaker model to said sphericity ratios obtained against other speaker models.

5. The method of claim 1, further comprising the step of receiving an asserted identity from said speaker, and wherein said sphericity ratio is used to recognize identity of said speaker by applying a threshold to said sphericity ratio to determine whether said speaker is a person associated with said asserted identity.

6. The method of claim 1, wherein said sphericity ratio may be expressed as follows:

$$\text{Score} = -\text{trace}(CU\ \text{inv}(CS))/\text{trace}(CU\ \text{inv}(CB));$$

where CS is a sample covariance matrix of the features extracted from the one or more enrollment utterances; CB is the sample covariance matrix of the features extracted from background data, and CU is the sample covariance matrix of the features extracted from the one or more test utterances.

7. The method of claim 6, wherein said expression trace (CU inv(CS)) evaluates how dissimilar said one or more test utterances are from said one or more enrollment utterances.

8. The method of claim 6, wherein said expression trace (CU inv(CB)) evaluates how dissimilar said one or more test utterances are from said background model.

9. The method of claim 1, wherein said background model is obtained from utterances of a plurality of speakers.

10. A method for recognizing a speaker, comprising the steps of:
    extracting features from one or more enrollment utterances to generate a target speaker model based on a sample covariance matrix generated from said extracted enrollment features;
    extracting features from one or more test utterances to generate a test utterance model based on a sample covariance matrix generated from said extracted test features; and
    computing a normalized similarity score that compares said test utterance model to said target speaker model and to a background model.

11. The method of claim 10, wherein said one or more enrollment utterances are obtained in an acoustic environment that is substantially matched to an acoustic environment of said one or more test utterances.

12. The method of claim 11, wherein said acoustic environment is associated with a portable computing device.

13. The method of claim 10, wherein said normalized similarity score is used to recognize the identity of said speaker by comparing said normalized similarity score of a given speaker model to said normalized similarity scores obtained against other speaker models.

14. The method of claim 10, further comprising the step of receiving an asserted identity from said speaker, and wherein said normalized similarity score is used to recognize the identity of said speaker by applying a threshold to said normalized similarity score to determine whether said speaker is a person associated with said asserted identity.

15. The method of claim 10, wherein said normalized similarity score may be expressed as follows:

$$\text{Score} = -\text{trace}(CU\ \text{inv}(CS))/\text{trace}(CU\ \text{inv}(CB));$$

where CS is a sample covariance matrix of the features extracted from the one or more enrollment utterances; CB is the sample covariance matrix of the features extracted from background data, and CU is the sample covariance matrix of the features extracted from the one or more test utterances.

16. An apparatus for recognizing a speaker, comprising:
    a memory; and
    at least one processor, coupled to the memory, operative to:
      extract features from one or more enrollment utterances to generate a target speaker model based on a sample covariance matrix generated from said extracted enrollment features;
      extract features from one or more test utterances to generate a test utterance model based on a sample covariance matrix generated from said extracted test features; and
      compute a sphericity ratio to recognize said speaker, said sphericity ratio comparing said test utterance model to said target speaker model and to a background model.

17. The apparatus of claim 16, wherein said one or more enrollment utterances are obtained in an acoustic environment that is substantially matched to an acoustic environment of said one or more test utterances.

18. The apparatus of claim 17, wherein said acoustic environment is associated with a portable computing device.

19. The apparatus of claim 16, wherein said sphericity ratio is used to recognize the identity of said speaker by comparing said sphericity ratio of a given speaker model to said sphericity ratios obtained against other speaker models.

20. The apparatus of claim 16, further comprising the step of receiving an asserted identity from said speaker, and wherein said sphericity ratio is used to recognize the identity of said speaker by applying a threshold to said sphericity ratio to determine whether said speaker is a person associated with said asserted identity.

21. The apparatus of claim 16, wherein said sphericity ratio may be expressed as follows:

$$\text{Score} = -\text{trace}(CU\ \text{inv}(CS))/\text{trace}(CU\ \text{inv}(CB));$$

where CS is a sample covariance matrix of the features extracted from the one or more enrollment utterances; CB is the sample covariance matrix of the features extracted from background data, and CU is the sample covariance matrix of the features extracted from the one or more test utterances.

22. The apparatus of claim 16, wherein said background model is obtained from utterances of a plurality of speakers.

23. An article of manufacture for recognizing a speaker, comprising a machine readable medium containing one or more programs which when executed implement the steps of:

extracting features from one or more enrollment utterances to generate a target speaker model based on a sample covariance matrix generated from said extracted enrollment features;

extracting features from one or more test utterances to generate a test utterance model based on a sample covariance matrix generated from said extracted test features; and computing a sphericity ratio to recognize said speaker, said sphericity ratio comparing said test utterance model to said target speaker model and to a background model.

* * * * *